Figure 1:
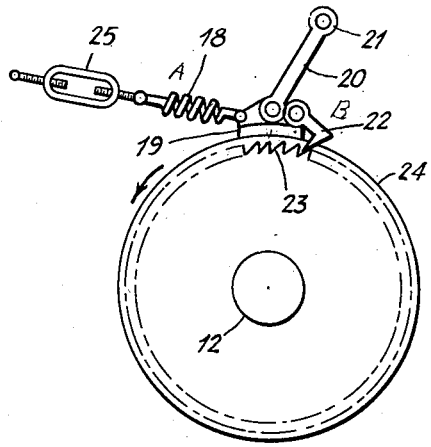

Sept. 14, 1937.  E. W. KELLOGG  2,092,882
DRIVE MECHANISM
Filed Dec. 29, 1933

INVENTOR
EDWARD W. KELLOGG
BY
ATTORNEY

Patented Sept. 14, 1937

2,092,882

UNITED STATES PATENT OFFICE 2,092,882

DRIVE MECHANISM

Edward W. Kellogg, Moorestown, N. J., assignor to Radio Corporation of America, a corporation of Delaware Application December 29, 1933, Serial No. 704,399

6 Claims. (Cl. 185—40)

This invention relates to drive mechanisms, such as are utilized in the operation of motion picture cameras or the like, and has for its principal object the provision of an improved apparatus and method of operation for maintaining constant the torque delivered from a variable torque source.

Another object is the provision of an improved mechanism whereby the torque delivered from a variable torque source may be maintained at a desired constant value over a predetermined range of operation.

A further object is the provision of an improved means for adjusting the magnitude of a constant torque derived from a variable torque source.

A source of power delivering constant torque or driving force is of especial value, not only for application to devices which it is desired to operate on constant torque input, but for operating many devices which should be driven at constant speed, and which depend on a governing mechanism, or on a constant load to give the desired constant speed. The governing or speed controlling means can operate to much greater advantage if the supplied torque is approximately constant, and there are often reasons for wishing to use a source of power which of itself is not adapted to delivering constant torque.

It is well known that the torque delivered by a spring motor, for example, tends to vary in value as the energy stored in the spring is released. Various other kinds of driving mechanisms, such as those involving the use of hand cranks and the like, also tend to produce a torque subject to objectionable variations. In accordance with this invention, such variations are obviated or minimized by the production and utilization of a retarding force controlled by or proportional to the variable torque and differentiated therefrom by a resultant torque which is constant over a range of operation dependent on the physical characteristics of the device.

Thus if the device is a spring motor, the retarding force may be produced by a brake or drag action resulting from and varying as the torque of the driving spring but differing therefrom by a torque value which is constant throughout a desired range of operation. Another means of producing a constant resultant torque is a differential gear interposed between the variable torque drive and the constant torque load and provided with a carriage arranged to control a retarding torque which differs from the driving torque by a predetermined amount. In either case, the magnitude of the net driving torque may be determined by means of a constant tension spring or other suitable means through which the pressure of a brake shoe is regulated. From the principles herein explained, those skilled in the art will readily understand how types of apparatus other than those mentioned may be arranged to produce the same result.

The invention will be better understood from the following description when considered in connection with the accompanying drawing and its scope will be pointed out in the appended claims.

Figure 2:
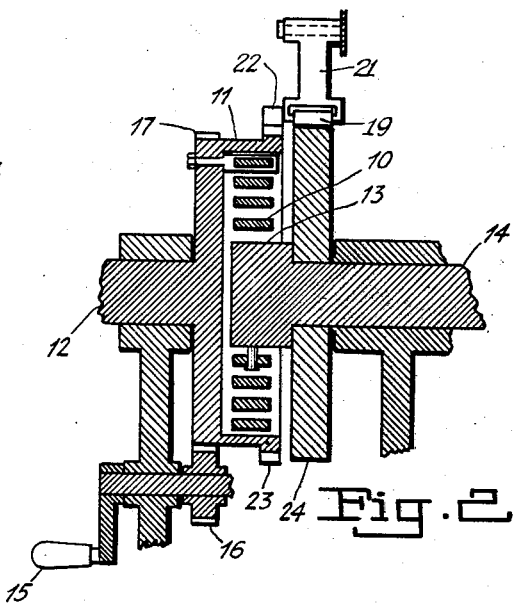
Figure 3:
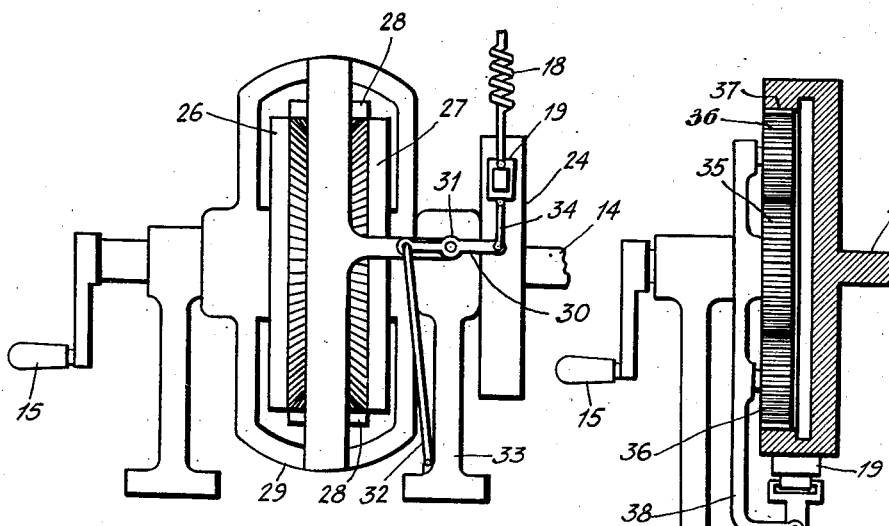
Figure 4:
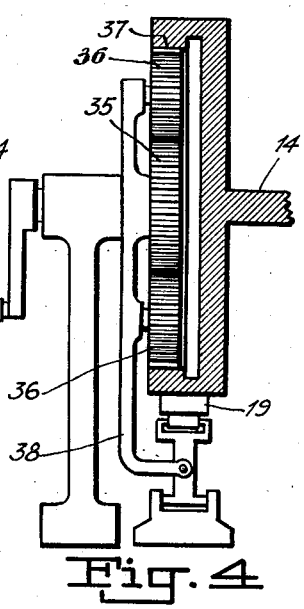

Referring to the drawing:

Figs. 1 and 2 illustrate different views of a spring motor constructed in accordance with one form of the invention, Fig. 3 is a view of a different arrangement wherein a differential gear is utilized to produce a retarding force, and Fig. 4 illustrates a further modification involving a gear arrangement different from that of Fig. 3.

The spring motor drive mechanism of Figs. 1 and 2 includes a spring 10 fixed at its outer end to a drum 11 mounted on a shaft 12 and at its inner end to a drum 13 on the end of the shaft 14. For the purpose of winding up the spring 10, power is applied to the drum 11 through a hand crank 15, gear 16 and gear 17 mounted on the outer periphery of the drum 11.

After the winding of the spring 10, reversal of rotation of the drum 11 is prevented, as is usual with spring motors, by a ratchet, but in the case of the present invention the thrust of the ratchet wheel 23 on the ratchet pawl 22, is taken up not by a fixed pivot and support, but by a brake shoe 19, in such a manner that the greater the tangential thrust on the pawl 22 the greater will be the normal or radial pressure of the brake shoe 19 on the drum 24, which is secured to rotate with the shaft 14 and therefore the more power absorbed by the brake.

It will be noted in Fig. 1 that the link 20 connecting the brake shoe 19 with the fixed pivot 21, makes an acute angle with the radius of the brake drum 24. Under these conditions a pull to the right on the brake shoe causes the said brake shoe to be pressed with magnified force against the drum. The drum, however, tending to rotate toward the left, exerts by friction a force toward the left on the brake shoe, and a tangential force toward the left tends to lift the brake from the drum. The friction is thus automatically adjusted to a value at which the brake shoe is in equilibrium. If, for example, there is an increase in the coefficient of friction between the drum and the brake shoe, the latter moves very slightly to the left and the normal pressure is thereby reduced until the frictional force is substantially what it was before. Or if an increased pull is exerted toward the right by the pawl 22, the radial pressure on the drum is increased and the friction correspondingly increased until it exerts on the brake shoe a substantially equal increase in force toward the left. Owing to the acute angle which the link 20 makes with the drum radius, a very slight unbalance in the tangential forces applied to the drum causes a large change in radial pressure and friction. It may therefore be said that the friction will always be opposite and substantially equal to the resultant of the other tangential forces applied to the brake shoe, as for example, by the pawl 22 and the spring 18, whose function will presently be explained.

In the foregoing explanation it is assumed that the friction is not so great as to prevent the drum from rotating, or in other words that the tangential force exerted by the drum on the brake shoe is limited by friction and not by the torque which the spring applies to the drum.

The operation of the device illustrated by Figs. 1 and 2 will be readily understood. When the spring 10 is wound up, its full thrust is applied through the ratchet wheel 23 to the pawl 22. This causes the brake shoe 19 to exert on the wheel 24 a pressure which of itself is sufficient to prevent rotation of the shaft 14. An auxiliary spring 18 is employed, however, which exerts on the brake shoe a force opposite to that of the pawl 22. The tangential force applied to the brake shoe through the spring 18 tends to lift the shoe 19 from the wheel 24 so that the drum and driven shaft are rotated.

That the effective driving torque under these conditions is proportional to the substantially constant tensile force of the spring 18 can be readily shown. Thus, if $r$ is the radius of the brake wheel 24, T is the driving torque of the spring 10 and P is the pull of the spring 18 on the shoe 19, it follows that the Backward pull on brake shoe by pawl $= F = \dfrac{T}{r}$ Forward pull on brake shoe by spring $= P$ Resultant tangential force on brake shoe $= F - P$ It has been shown that the frictional force is equal to this resultant $F - P$, and since the friction retards the drum by exactly the same force with which it urges the brake shoe to the left, it follows that Torque absorbed by brake $= (F - P)r$
Output or driving torque $= T - (F - P)r$ $$= T - \left(\dfrac{T}{r} - P\right)r = Pr$$

The spring 18 may consist of a relatively large number of turns for preventing substantial variation in its tensile force due to slight movement of the brake shoe 19 and may be provided with a turn buckle 25 or other suitable means for adjusting its tension to the desired value.

The magnitude of the toque delivered to the driven shaft 14 is therefore readily adjusted to any desired value by manipulation of the turn buckle 25 to change the tension of the spring 18 on the brake shoe 19. Although one of the most important applications of my invention is to spring motors, the advantages of the invention are not limited to the use of a spring.

Fig. 3 illustrates an arrangement by which these advantages may be realized in the case of any device wherein the power is not constant. A hand crank is used to illustrate such a power supply. In order to obtain a pull on the brake shoe proportional to the supplied torque, corresponding to the pull of the ratchet pawl in Figs. 1 and 2, the power for the driven shaft 14 is transmitted through a differential gear device including a driving gear 26, a driven gear 27 and an idler gear 28 mounted within a rotatable carriage 29 forming part of the brake control mechanism. This mechanism, it will be observed, also includes a lever 30 pivoted at 31 to the carriage 29, a rod 32 fixed at its lower end to a bearing pedestal 33 and pivoted at its upper end to the left hand end of the lever 30, and a brake rod 34 which functions to apply to the brake shoe 19 a force similar to that applied to the brake shoe of Fig. 1 by the pawl 22 and ratchet wheel 23.

It will be apparent that the mechanism including the carriage 29, the lever 30 and the rod 32 should be so proportioned that the tangential pull exerted on the brake shoe 19 through the rod 34 is equal to the torque applied through the hand crank 15 or by other variable torque means.

With the usual type of beveled gear differential the torque applied to the differential gear carriage is twice the torque being transmitted from one shaft to the other. Therefore, in this case, a linkage would be employed such that the backward pull on the brake shoe 19 is only half that developed at the radius by the differential gear carriage.

Various modifications of differential gear are possible in which the driving and driven sides run at different speeds. Thus, Fig. 4 illustrates a drive system wherein a gear 35 mounted on the same shaft as the hand crank 15 is utilized to drive the load shaft 14 through gears 36 and ring gear 37. In this case, the brake shoe 19 cooperates with the outer periphery of the gear 37 and is controlled in response to movement of the gears 36 to apply a retarding force which is proportional to the power transmitted between the driving and driven shafts. This result is accomplished by means of a lever 38 which provides a bearing for the gear 36 and is pivoted at the driven shaft at one end and to the brake control mechanism at the opposite end.

In the case of the employment of such a differential gear the torque applied to the driven side and the torque reaction on the carriage are readily calculated and the necessary mechanism for increasing or decreasing the tangential force applied to the brake shoe can be determined readily. Neglecting friction in the differential gear system and at other points where it may exert a slight effect, the backward pull on the brake shoe should be made to exactly equal the entire tangential force applied to the brake wheel by the driving system. If this equality is not obtained but only proportionality, then instead of developing a constant output torque dependent solely on the tension of the spring 18, the output torque will be the sum of a constant quantity depending upon the pull of the spring 18 and a second factor proportional to the driving torque applied. It is possible to make this second factor negative so that the greater the applied torque the less the output torque. As normally utilized, however, the device has for its purpose the derivation of a constant torque from a variable torque source.

I claim:

1. A drive mechanism including means operable to produce a variable torque, a member arranged to be driven by said means, means tending to subject said member to a counter torque, and means for producing a constant difference between said torques.

2. A drive mechanism including means operable to produce a variable torque, a member arranged to be driven by said means, means tending to subject said member to a counter torque, means for producing a constant difference between said torques, and means for adjusting the magnitude of said constant difference.

3. A drive mechanism including means operable to produce a variable torque, a member arranged to be driven by said means, means tending to subject said member to a counter torque, and means including a resilient member exerting a force opposed to said counter torque for causing said first-mentioned member to be subjected to a torque of constant value.

4. A drive mechanism including means operable to produce a variable torque, a member arranged to be driven by said means, means including a pawl and ratchet for applying to said member a braking torque, and means for producing a constant difference between said variable torque and said braking torque.

5. A drive mechanism including means operable to produce a variable torque, a member arranged to be driven by said means, means including a differential gear for applying to said member a counter torque, and means for producing a constant difference between said torques.

6. A drive mechanism including means operable to produce a variable torque, a member arranged to be driven by said means, means including a differential gear for applying to said member a counter torque, and means for producing a constant difference between said variable torque and said counter torque.

EDWARD W. KELLOGG.